United States Patent
Voogd et al.

(10) Patent No.: US 7,530,327 B2
(45) Date of Patent: May 12, 2009

(54) DEVICE FOR AND A METHOD OF AUTOMATICALLY SUPPLYING FEED TO ANIMALS

(75) Inventors: Lucien Eliza Niels Voogd, Leerdam (NL); Karel van den Berg, Bleskensgraaf (NL)

(73) Assignee: Lely Enterprises A.G., Zug (CH)

( * ) Notice: Subject to any disclaimer, the term of this patent is extended or adjusted under 35 U.S.C. 154(b) by 0 days.

(21) Appl. No.: 10/261,667

(22) Filed: Oct. 2, 2002

(65) Prior Publication Data
US 2003/0061996 A1   Apr. 3, 2003

(30) Foreign Application Priority Data
Oct. 3, 2001   (NL) .................................... 1019094

(51) Int. Cl.
*A01K 5/02*   (2006.01)
(52) U.S. Cl. .................................. 119/51.02; 119/14.18
(58) Field of Classification Search .............. 119/51.02, 119/53, 56.1, 14.18
See application file for complete search history.

(56) References Cited

U.S. PATENT DOCUMENTS

| | | | | |
|---|---|---|---|---|
| 3,557,758 A | * | 1/1971 | Lack | 119/51.02 |
| 4,129,855 A | * | 12/1978 | Rodrian | 340/5.63 |
| 4,461,241 A | * | 7/1984 | Ostler | 119/51.02 |
| 4,463,353 A | * | 7/1984 | Kuzara | 340/10.34 |
| 4,493,290 A | * | 1/1985 | Gibbard | 119/51.02 |
| 4,517,923 A | * | 5/1985 | Palmer | 119/51.02 |
| 4,532,892 A | * | 8/1985 | Kuzara | 119/51.02 |
| 4,843,561 A | | 6/1989 | Larson | 364/478 |
| 6,371,047 B1 | | 4/2002 | Van Den Berg | 119/51.02 |
| 6,520,113 B2 | * | 2/2003 | van den Berg et al. | 119/57.2 |
| 6,651,584 B2 | * | 11/2003 | van den Berg | 119/51.02 |

FOREIGN PATENT DOCUMENTS

| | | |
|---|---|---|
| DE | 3144477 C1 | 11/1982 |
| DE | 4137387 A1 | 5/1993 |
| EP | 0974264 A1 | 1/2000 |
| NL | 1010898 | 6/2000 |

* cited by examiner

*Primary Examiner*—Kimberly S Smith
(74) *Attorney, Agent, or Firm*—Howrey LLP (57) ABSTRACT

An apparatus and method for automatically supplying feed to animals such as cows. A control device generates a control signal for controlling the supply of feed to be consumed by an animal at a feed trough. A parameter-measuring component determines the value of a variable parameter which bears a relationship to the feed to be supplied to an animal at the feed trough and issues a parameter value signal to the control device. The control device is provided with a processing device for processing the parameter value signal into the control signal. The parameter-measuring component measures the parameter involved which relates to an animal that feeds at the feed trough and issues a signal providing information as to that parameter to the processing device. The parameters which may be measured include the existing physical condition profile of the animal, the rate that the animal consumes feed from the feeding trough, the existing milk yield of an animal at the feeding trough, and the amount of one or more ingredients which are present in the milk produced by the animal at the feeding trough, including proteins, fat, minerals and amino acids.

2 Claims, 7 Drawing Sheets

DEVICE FOR AND A METHOD OF AUTOMATICALLY SUPPLYING FEED TO ANIMALS

FIELD OF THE INVENTION

The invention relates to a feeding apparatus for automatically supplying feed to animals, such as cows, having a control device for controlling the feed supply based on a parameter value which pertains to the animal being milked or the environment.

BACKGROUND OF THE INVENTION

Such apparatus, also called feed mixing apparatus, is known from European Patent Application No. EP-A-0974264. In this known apparatus, feed is supplied to the animal based on the temperature of the feed, the temperature of the ambient environment, and on, in the broadest sense of the word, physiological data pertaining to the animal, in particular the temperature of its skin or its internal temperature, the humidity of its skin, and the composition of its excrements.

It is an object of the invention to provide an alternative apparatus for automatically supplying feed to animals.

SUMMARY OF THE INVENTION

According to the invention, the apparatus supplies feed to an animal based on the animal's physical profile. It has been found that the ratio and amount of types of feed to be supplied to provide an optimal feed intake depends on the condition profile of the animal. The ratio and the amount of type feed to be supplied can then also be adapted so as to obtain an improvement of the condition profile. When the condition profile indicates for example that the animal has a deviating value in comparison with its standard condition profile, the amount and ratio of types of feed to be supplied can ensure that the animal more nearly consumes precisely the required types of feed.

The invention also relates to an apparatus for automatically supplying feed to animals, such as cows, which is provided with a control device for controlling the supply of feed, and with parameter-measuring means for measuring an ongoing value of a variable parameter and for issuing a parameter value signal to the control device which has processing means for processing the parameter value signal into the control signal, characterized in that the parameter measuring means comprises means for determining the consumption rate for each animal and for issuing a consumption rate signal to the processing means. Careful research has established that the consumption rate of the animal is an indication of the amount and ratio of types of feed which the animal finds the tastiest. Such data can be used for introducing certain additives, such as medicines, to the types of feed most rapidly consumed by the animal.

The invention further relates to an apparatus for automatically applying feed to dairy animals, such as cows, having a control device which generates a control signal for controlling the supply of the feed and a parameter-measuring means for measuring the ongoing value of a variable parameter and for issuing a parameter value signal to the control device. The control device is also provided with a processing means for processing the parameter value signal into the control signal, characterized in that the parameter measuring means measures the milk yield of the animal and issues a signal thereof to the processing means. Although the relation between the energy contents of feed and milk yield is known in the art, the invention is based on the insight that the automatic feedback by measuring the milk yield quickly leads to an adaption for optimal feeding.

The invention further relates to an apparatus for automatically supplying feed to dairy animals, such as cows, which is provided with a control device that generates a control signal for controlling the supply of feed, and a parameter-measuring means for measuring the ongoing value of a variable parameter and for issuing a signal thereof to the control device. The control device is provided processing means for processing the parameter value signal into the control device, the invention being characterized in that the parameter measuring means measures the amount of an ingredient in the milk produced by a dairy animal, such as protein or fat or minerals or amino acids, or any combination thereof and issuing a relevant signal to the processing means. It is thus possible automatically and continuously to ensure that in the total feed to be offered to a dairy animal contains the required ingredients for that dairy animal whereby the appropriate amounts of ingredients, such as fats, proteins, sugars, and the like, are present in the milk obtained from that dairy animal.

In a preferred embodiment of an apparatus according to the invention, the apparatus is provided with means for measuring the amount of a type of feed consumed by an animal and for issuing a consumed-feed signal to the processing device. Thus it is possible to determine in a simple manner whether and, if in the affirmative, how much of the feed offered to the animal has actually been consumed by the animal.

The invention further relates to an apparatus for automatically supplying feed to animals, such as cows, which is provided with a control device that generates a control signal for controlling the supply of the feed. A parameter-measuring means is also provided for measuring the ongoing value of a variable parameter and for issuing a signal thereof to the control device which is provided with a processing device for processing the parameter value signal whereby the control device is provided with means for measuring the amount of a type of feed consumed by an animal and for issuing a consumed-amount signal to the processing device. Thus it is possible to determine in a simple manner whether and, if so, how much of the feed offered to the animal has actually been consumed by the animal.

For the purpose of inputting the relevant data, the control device is provided with a computer having a memory and an inputting component for inputting data into the memory.

Because some of the above-mentioned data are not known to a farmer, it is advantageous when the control device is provided with a computer which is suitable for generating itself data for the memory. It is possible for example that the control device changes the amount and ratio of feed to be offered for a particular condition profile, and always determines the intake of the animal at each selected amount and ratio. Thus the control device itself may determine the optimal amount and ratio at a particular condition profile.

Because an animal is a living organism that is continually changing physiologically, it is advantageous that the data be updated continuously, so that on determining the amount and ratio of types of feed to be supplied to an animal that its physiological changes be taken into account.

To add appropriate substances to the feed of particular animals such as medicines, it is advantageous when the apparatus is provided with a mechanism for such purpose.

When the apparatus is provided with detection means for determining, at a point of time after a supply of an amount of feed, the amount of feed so received, and for issuing a signal based thereon, the consumption rate for the feed by an animal can for example be readily calculated.

In a preferred embodiment of an apparatus according to the invention, it is provided with a plurality of hoppers, each for containing a stock of a particular type of feed, with a feed trough which is accessible to an animal, and with conveying means for conveying feed from the hoppers to the feed trough. The control device is preferably suitable for controlling the apparatus in such a way that types of feed are supplied to the feed trough in desired amounts and ratios.

The detection means comprises a weighing device for weighing the amount of feed in the feed trough, although other means, such as picture recognition equipment, may be applied as well.

To prevent an animal from remaining at a feed trough after having been fed, in an embodiment of an apparatus according to the invention, the feed trough is designed to be closed by a closing means, the control device also being suitable for controlling the operation of the closing means.

An apparatus according to the invention can be applied inter alia in milking compartments having milking robots. However, the invention is in particular advantageous when the apparatus is a feeding column, in which case several animals can make use of the apparatus simultaneously. For such purpose the feeding column is provided in a known manner with a framework which surrounds a central axis, with a plurality of feed troughs and hoppers fitted to the framework.

Although the data in relation to the type of feed and the hoppers corresponding therewith can be inputted into the computer, it is preferred when the apparatus is provided with feed-determining means for determining the type of feed in each hopper. Such feed-determining means may comprise for example an olfactometer, a color meter or picture recognition equipment.

An advantageous embodiment of an apparatus according to the invention is provided with a receptacle, the conveying means comprising a first conveyor for conveying an amount of feed from the hopper to the receptacle and a second conveyor for conveying feed from the receptacle to the feed trough. The receptacle is preferably provided with a weighing mechanism for measuring feed present in the receptacle which enables a determination the amount of feed to be supplied to the feed trough.

Although the feed can be removed from the receptacle by means of separate taking-out means, for the sake of simplicity of the construction it is advantageous in lieu of separate means for feed removal, a tiltable receptacle be provided, feed flowing from the receptacle when it is tilted. However, for improving the hygienic use of the apparatus, it is preferred that the bottom of the receptacle is designed to be opened. The receptacle is preferably provided with a control mechanism for controlling the opening of the bottom. It is also particularly suitable that a second conveyor be provided which is a tube-shaped chute or a channel-shaped chute.

The invention also relates to a method of automatically supplying feed to animals, such as cows, which comprises the step of measuring the ongoing value of a variable parameter and providing a parameter value signal, whereby the supply of feed is based on the parameter value signal and characterized in that the condition profile of the relevant animal is the variable parameter.

The invention also relates to a method of automatically supplying feed to animals, such as cows, comprising the step of measuring the ongoing value of a variable parameter and providing a parameter value signal, the supply of feed being based on the parameter value signal, characterized in that the variable parameter comprises the consumption rate of an animal is selected.

The invention also relates to a method of automatically supplying feed to animals, such as cows, comprising the step of measuring the instantaneous value of a variable parameter and providing a parameter value signal, the supply of feed being based on the parameter value signal, characterized in that the variable parameter comprises the milk yield of the animal.

The invention also relates to a method of automatically supplying feed to animals, such as cows, comprising the step of measuring an instantaneous value of a variable parameter and providing a parameter value signal upon which the supply of feed is based, wherein the variable parameter is the amount of an ingredient in the milk from a dairy animal, such as protein or fat or minerals or amino acids.

The invention also relates to a method of automatically supplying feed to animals, such as cows, comprising the step of measuring an ongoing value of a variable parameter and providing a signal based thereon, the supply of feed provided to the relevant animal being based on the signal, characterized in that the variable parameter is selected on the basis of the amount of a type of feed which is consumed by such animal.

BRIEF DESCRIPTION OF THE DRAWINGS

The invention will now be explained in further detail with reference to embodiments shown in the accompanying drawings, in which.

DETAILED DESCRIPTION OF THE PREFERRED EMBODIMENTS OF THE INVENTION

Figure 1:
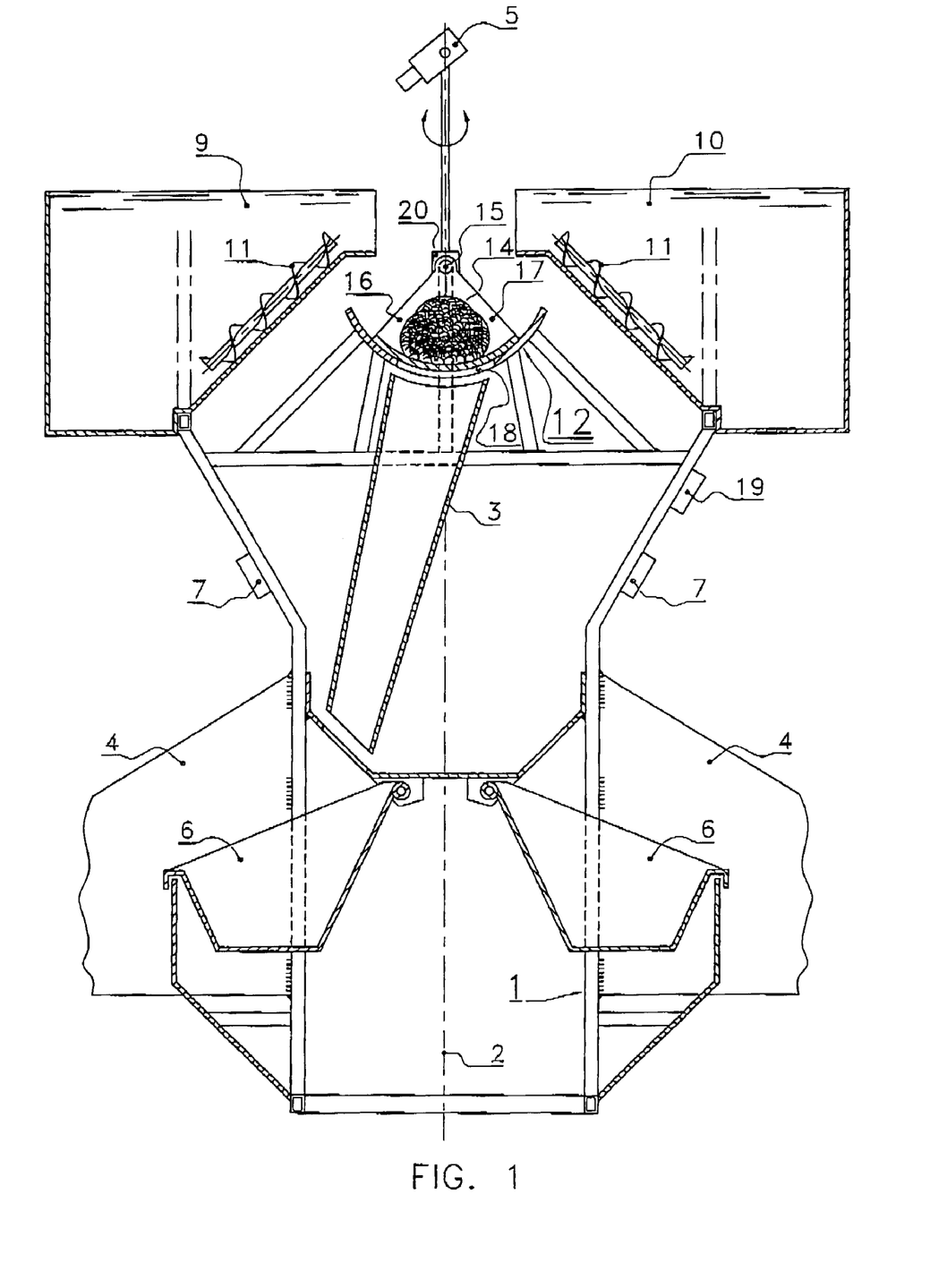
FIG. 1 is a schematic cross-sectional side view of an embodiment, in the form of a feeding column, of an apparatus according to the invention.

In the embodiment depicted in FIG. 1 a framework 1, having a substantially circular circumference, is disposed around a central axis 2. A plurality of hoppers 9 and 10 (only two of which are shown in the drawing) are located at the upper aspect of framework 1. Each hopper 9 and 10 contains a particular type of feed.

Framework 1 is provided with partitions 4 which are detachably disposed on framework 1.

Feed troughs 6 for the animals are disposed in a circular arrangement in the lower part of the apparatus. By means of the geometry of the apparatus, in the embodiment shown constituted by a feeding column, the structure occupies relatively little space, while the accessibility of the feeding column to the animals is optimal from all directions.

The feeding column further comprises conveying means comprising a first conveyor 11 ad a second conveyor 3 for conveying feed from hoppers 9 and 10 to the relevant feed trough 6. The feed can be conveyed directly from hoppers 9 and 10 to feed troughs 6. But in the embodiment shown a centrally positioned receptacle 12 is provided for receiving a measured amount of feed conveyed by a first conveyor 11 from either or both hoppers 9 and 10. As a first conveyor 11, an auger, gripper, conveyor belt, or any other appropriate construction for conveying feed, may be used.

Second conveyor 3, preferably a tube-shaped or channel-shaped chute, is suitable for conveying a measured amount of feed from receptacle 12 to a relevant feed trough 6. For conveying the feed to a relevant feed trough 6, it is advantageous when the tube-shaped chute 3 is rotatably mounted in the feeding column. Chute 3 is preferably composed of stainless steel.

The apparatus is provided with a control device 19 which controls the components of the apparatus so that the types of feed are supplied in a particular ratio and in a particular amount to a feed trough 6.

The apparatus may be provided with a feed-determining means 5 for determining the types of feed in hopper 9 and 10. Such feed-determining means may comprise for example an olfactometer, a color meter or picture recognition equipment (such as described for example in U.S. Pat. No. 4,843,561).

For the purpose of conveying a measured amount of a type of feed 14 delivered to tube-shaped chute 3, receptacle 12 has a bottom which is designed to be opened. In the embodiment shown the bottom of receptacle 12 has two halves 16 and 17 which are pivotable about an axis 15. When halves 16 and 17 move away from each other, an aperture 18 is produced through which feed 14 in receptacle 12 falls into tube-shaped chute 3.

Control device 19, although another control device may serve as well for the same purpose, controls the opening of the bottom of receptacle 12. Said control device 19 preferably also controls the order of functioning of first and second conveyors 11 respectively, so that the supply of the type of feed takes place quickly.

Identification means 7 are provided for identifying an individual animal. In the embodiment shown, identification means 7 are disposed on framework 1, but it will be appreciated that identification means can also be disposed at other places, such as, for example, on feed trough 6. With the aid of identification means 7 the identity of an animal present at a feed trough 6 is established automatically. With the aid of data stored in the memory of, for example, control device 19, the amounts of types of feed intended for that animal can then be supplied in a particular ratio. With the aid of weighing mechanism 20, well known in the art, the amount conveyed to receptacle 12 by first conveyor 11 can then be checked. Control device 19 further controls, with the aid of data from animal identification means 7, the movement of tube-shaped chute 3 so that the ladder is located just over the correct feed trough 6. Control device 19 further controls the drives of conveyors 11.

Figure 2:
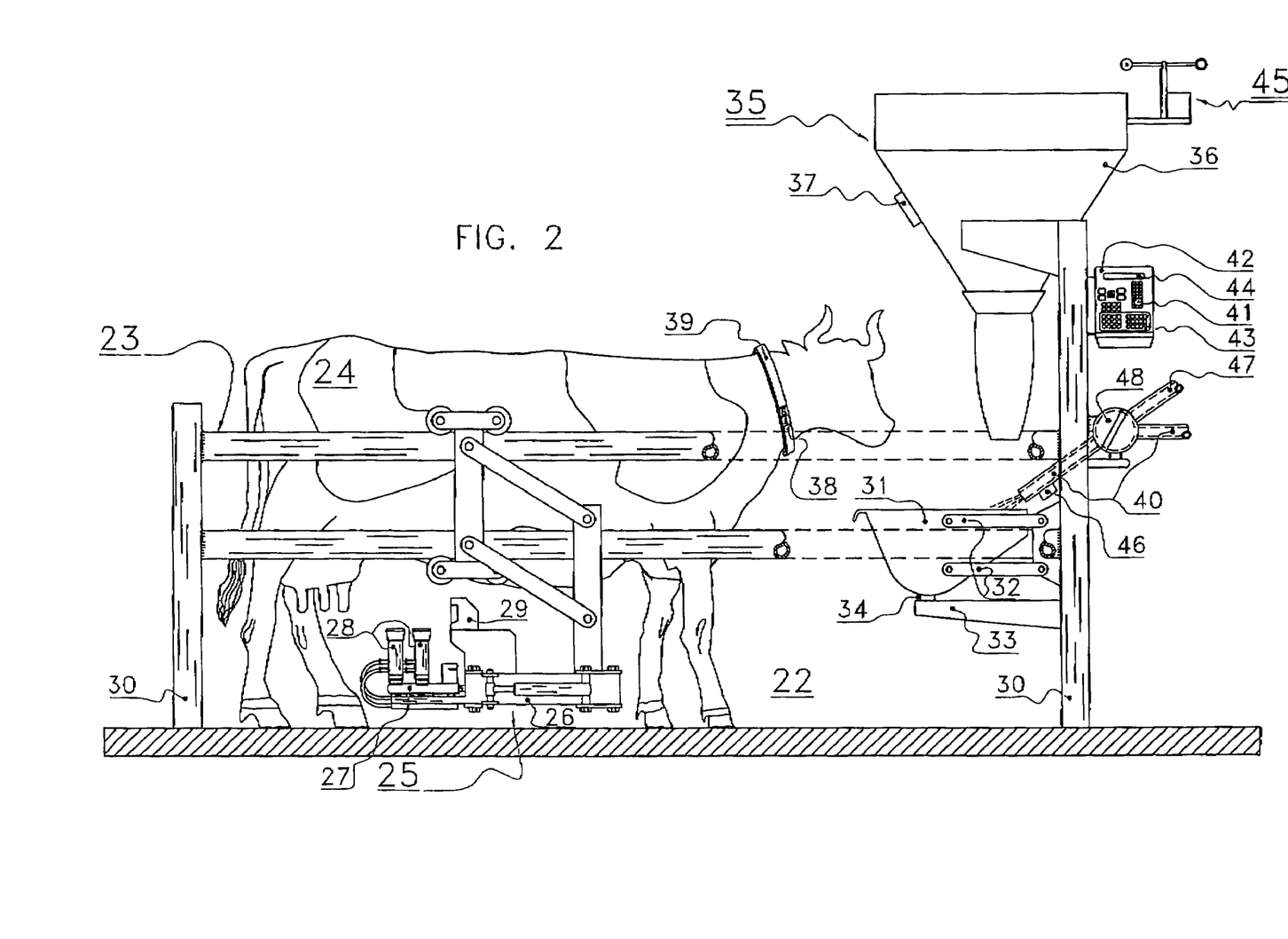
FIG. 2 is a schematic side elevational view of an embodiment of a device according to the invention, integrated in a milking compartment.

FIG. 2 is a side elevational view of a milking compartment 22 comprising a framework 23 which surrounds a cow 24 during her stay in milking compartment 22. On one side of milking compartment 22 a milking robot 25 is disposed. Milking robot 25 comprises for example a robot arm 26 having at its end teat cups 28 supported by a carrier 27. On robot arm 26 near teat cups 28 a sensor 29 is further disposed with the aid of which the position of the teats of a cow to be milked can be determined.

Near the forward end of milking compartment 22, a feed trough 31 is fastened to a post 30. In the embodiment shown feed trough 31 is connected to post 30 by means of a parallelogram hinge construction 32. Feed trough 31 is supported at its lower aspect by a supporting beam 33. Between supporting beam 33 and the lower side of feed trough 31 there is further disposed a measuring means 34 by means of which the weight of feed trough 31 with contents can be determined. In the present embodiment measuring means 34 comprises a piezo-element. It will be understood, however, that the invention is not limited to this specific manner in which the contents of the feed trough are measured, and hereinafter alternative means for determining the weight of the feed trough with contents will be described.

Over feed trough 31, fitted to post 30, is a feed metering device 35 comprising a plurality of hoppers (only one of which is shown in the drawing), each for containing one type of feed, and a tube-shaped chute. Feed metering device 35 comprises a reservoir 36 surrounding the hoppers for receiving the different type of feed. On the outer wall of reservoir 36 is a receiver 37 constituting part of an animal identification system. Receiver 37 thus receives signals from a transmitter 38 which is disposed for example on a collar 39 around the neck of cow 24. It will be appreciated that different kinds of animal identification systems may be employed in the invention and that the invention is not limited to one genre of identification systems. The receiver and the transmitter may further be disposed at different places. The receiver may be disposed for example on feed trough 31 and a transmitter may be implanted in the cow.

Near the upper side of feed trough 31, further fitted to post 30, is a liquid-supplying device 40, for example a sprayer, with the aid of which a measured amount of liquid, for example water, or a viscous liquid, such as syrup or treacle, can be added to the feed present in feed trough 31.

The apparatus operates as follows:

After cow 24 has entered the milking compartment 22 whereby transmitter 38 is in the receiving range of receiver 37, cow 24 is automatically identified by the identification system. Data relating to the types of feed and amounts thereof previously offered to the cow involved for prior feeding runs are stored in a memory 41 of a computer 42.

When cow 24 has been identified, the identification system send a signal to computer 42 which, with the aid of data stored in memory 41, controls the feed metering device 35 in such a way that an amount and ratio of types of feed prescribed for cow 24 are supplied to it.

The feed consumed by a cow can be optimized further by adding a measured amount of liquid to a type of feed in feed trough by means of liquid-supplying device 40. The amount of liquid to be added per cow per type of feed is determined for each cow with the aid of data in memory 41 of computer 42. Said data contain for each cow information on the amount of feed to be consumed by the cow and amount of liquid which should be added to obtain, for example, the desired milk production from the animal. Thus, after cow 24 has been identified, computer 42 issues a signal to liquid-supplying device 40 for supplying the relevant amount of liquid. For that purpose computer 42 uses the relevant data from memory 41.

For the first use of the device according to the invention these data can be inputted into the memory 41 by making use of inputting means, such as a keyboard 43. This can be done by a dairy farmer who inputs values for each cow and type of feed to be supplied to the relevant cow according to his experience. For facilitating the input and for checking the functioning of the apparatus during the use thereof, computer 42 comprises a display screen 44.

The apparatus may include a measuring means 45 of a type well known in the art for measuring the atmospheric conditions, such as temperature, air humidity, atmospheric pressure, wind speed and the like. Data in memory 41 can also contain for each cow the relationship between the amount of liquid to be added for each type of feed based on the environmental conditions, which relationship is used to provide a desired feed intake.

Thus, in the embodiment described, after a visit of a cow to the milking compartment, the following data relating to such cow are stored in the memory: the amount consumed per type of feed, the amount of liquid added per type of feed, the ambient temperature, the air humidity, the atmospheric pressure, the wind speed, and the milk yield. When a cow has consumed all the feed supplied, said data are processed by the computer into the memory, so that at a next visit of the same cow under the same circumstances the same amounts of liquid will be added to the type of feed as previously provided.

When a cow has not consumed all the feed, at the next visit of the cow to the milking compartment it is possible to change the amount of liquid which is added to the types of feed or the ratio and amount in which the types of feed are offered. For changing the amount of liquid to be added different approaches are possible. For example, the amount of liquid to be added can be increased at the next visit by 5% (another increase, or even decrease, is also possible, of course), after which the amount of feed consumed is measured. Accordingly, the amount of liquid is changed automatically for each visit of the cow to the milking compartment until the cow has consumed the entire amount of the type of feed supplied. In the latter case the data are recorded by the computer in the memory as standard values. Otherwise, they are stored temporarily, for providing the possibility of determining the standard values. The control device comprising the computer can be programmed so that certain data have priority for determining the amount of liquid to be added. An example of a priority order is: amount consumed of the type of feed, milk yield, air humidity, temperature, atmospheric pressure, wind speed. Of course, another order, in accordance with the wishes of the farmer, is possible as well. Thus there is provided an iterative way of determining the amount of liquid to be added for obtaining the optimal feed intake.

Liquid-supplying device 40 may be provided with a heating device or cooling device 46 for introducing the liquid at a temperature suitable for optimal feed intake and possibly making the viscous liquid more processable. The operation of the heating/cooling device 46 can also be controlled by computer 42 with the aid of data from the identification system and data from memory 41.

The device is provided with an additive mechanism 47 for introducing additives to the feed. Said additive mechanism can be controlled by computer 42 which controls for example a valve 48 based on data from the identification system and data from memory 41. As a result thereof for each cow individually certain additives, such as medicines, vitamins, fish oil, salts, minerals, and the like, can automatically be introduced into the feed.

By means of measuring means 34 it is further determined how much feed a relevant cow has consumed during its feeding time. The amount of the type of feed and the amount of liquid added can also be determined separately. These data can be used for continuously updating the data in the memory and possibly adapting them to a changing eating behavior of the cow.

As mentioned above, some alternatives for determining the weight of a feed trough, in particular the amount of feed present therein, will now be described.

Figure 3:
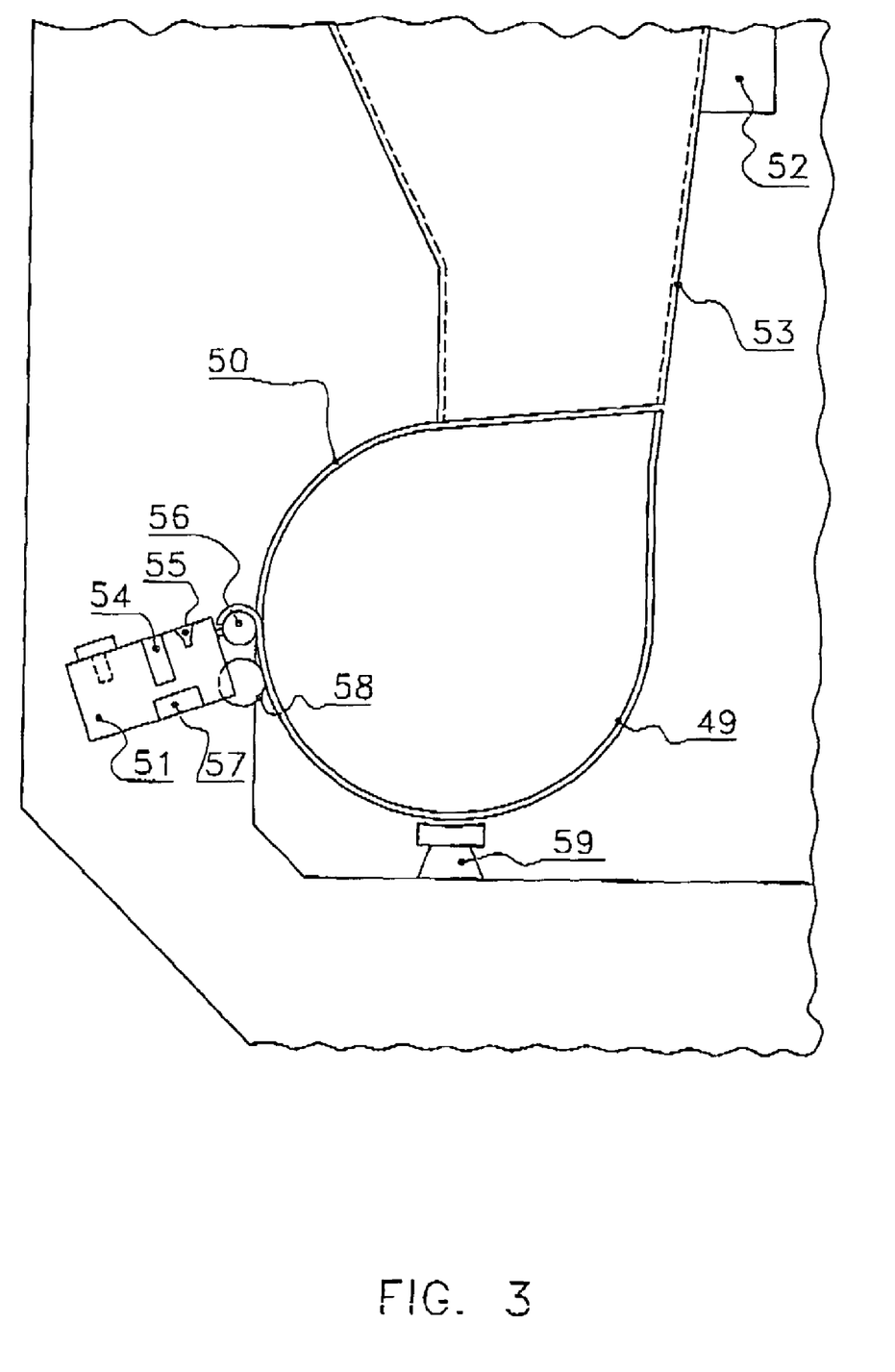
FIG. 3 shows a first embodiment of means for measuring the amount of a type of feed consumed by an animal in an apparatus according to the invention.

FIG. 3 shows schematically a first embodiment of a feed trough 49 for containing feed. An entrance opening 50 provides an animal, for example a cow, access to feed trough 49. A known identification system may include an animal identification component 51, which is disposed near feed trough 49 and recognizes a particular animal approaching the feed trough 49 with the intent to make use of it. With the aid of data from animal identification component 51, a control device 52 supplies a predetermined amount of a particular type of feed to feed trough 49, the amount of said type of feed falling into feed trough 49 via for example a tube-shaped chute 53.

By weighing the amount of the type of feed present in the feed trough, it can be determined how much of a particular type of feed is consumed by a particular animal, and also whether remaining feed is present in the feed trough. The means for weighing the feed present in the feed trough is preferably connected with the control device for supplying, with the aid of data both from the animal identification system and the mechanism for weighing, an amount of a type of feed to the feed trough, while the amount of a type of feed left by the previous animal can thus be taken into account.

In FIG. 3 the means for weighing feed present in feed trough 49 includes feed trough 49 which is pivotable about a pivot axis 56. The degree of pivoting is determined by the weight of the feed present in the feed trough 49. An instrumentality 57 is provided for determining the degree of pivoting of feed trough 49 and for deducing therefrom the weight of feed present in feed trough 49. Instrumentality 57 for determining the degree of pivoting of feed trough 49 comprises a measuring roll 58 which is in contact with the feed trough. From the degree of rotation of measuring roll 58 the degree of pivoting and thus the amount of feed in feed trough 49 can be determined.

Because instrumentality 57 and measuring roll 58 for determining the degree of pivoting of feed trough 49 are integrated in the animal identification component 51, a compact construction is obtained.

Figure 4:
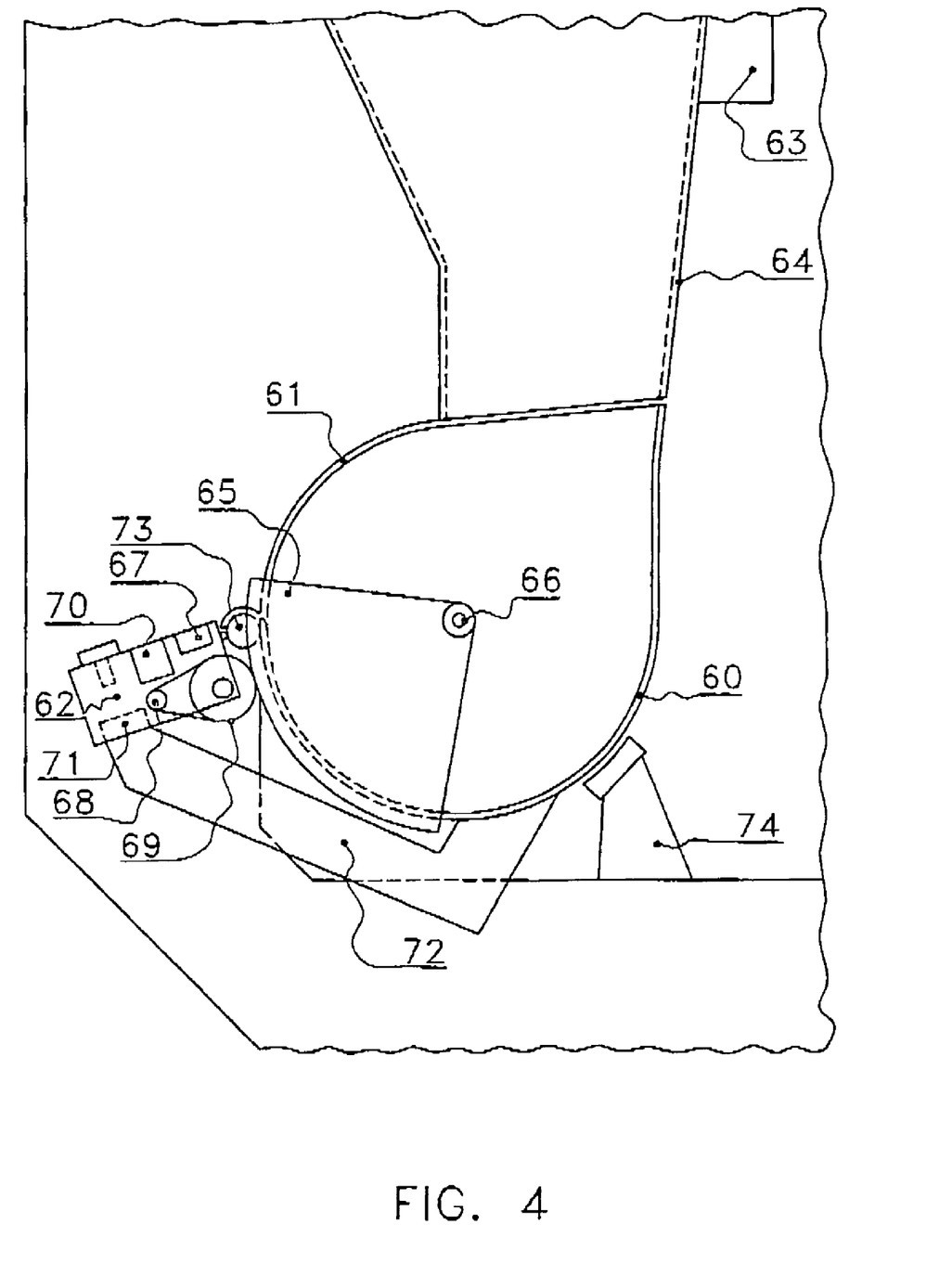
FIG. 4 shows a second embodiment of means for measuring the amount of a type of feed consumed by an animal in an apparatus according to the invention.

Alternatively or additionally, as shown in FIG. 4, a pivoting-determination device 70 for determining the degree of pivoting of feed trough 60 and for deducing therefrom the weight of feed present in feed trough 60, may comprise a dynamometer 71. In the embodiment shown, feed trough 60 bears on dynamometer 71 via a supporting arm 72. In this situation feed trough 60 pivots about a pivot axis 73. Dynamometer 71 is preferably included in an animal identification component 62.

In the embodiments shown in FIGS. 3 and 4, even small differences in weight can be measured, because pivot axes 56 and 73, and measuring roll 58 and dynamometer 71 are respectively located at small distances from each other.

To prevent undesired cases of malfunction, for example when the animal pushes the feed trough downwardly with force, whereby the measuring roll or the dynamometer or the like could be damaged, in both embodiments safety supports 59 (FIG. 3) and 74 (FIG. 4) for supporting the respective feed troughs 49 and 60 are provided.

Figure 5:
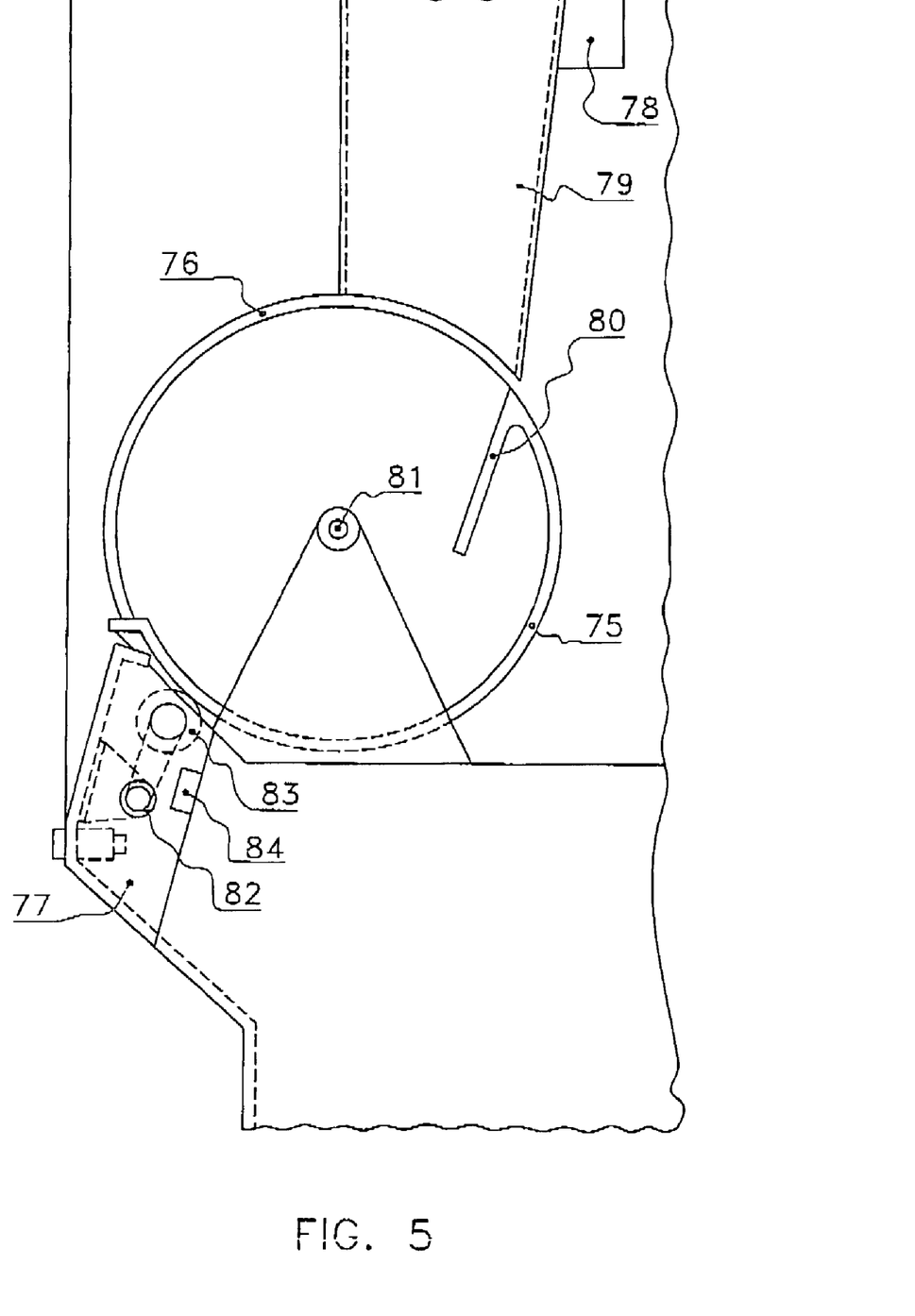
FIG. 5 shows a third embodiment of means for measuring the amount of a type of feed consumed by an animal in an apparatus according to the invention.

In a third embodiment, as shown schematically in FIG. 5, the means for weighing the feed present in the feed unit comprise a movable feed trough 75. Feed trough 75 is moved in a reciprocating manner by a motor 82 by which a roll 83 is driven. As a result of this movement a torque is created, the magnitude of which is determined by an instrument 84 for measuring the magnitude of the torque. From the torque determined, instrument 84 deduces the weight of the amount of a type of feed present in the feed trough. The exact correlation between torque and amount of feed can previously be determined by simple calibration tests.

The embodiment according to FIG. 5 has a compact construction because motor 82 for moving feed trough 75, and instrument 84 for measuring the magnitude of the torque during moving and for deducing the weight of the amount of the type of feed present in feed trough 75 from the measured magnitude of the torque, are integrated in the animal identification component 77.

The feed trough may be provided with means for preventing an animal intending to make use of the feed trough at an undesired point of time from doing so, or preventing that animal from making further use of the feed trough (for example for the remaining types of feed) or making further use of the feed trough impossible for that animal, with the aid of data from the animal identification system. As a result thereof it is possible to deter, in a simple, efficient and inexpensive manner, animals which are not eligible to be fed from placing their heads into the feed trough, and to teach an animal first to consume the type of feed present in the feed trough before another type of feed is offered.

In the first embodiment shown in FIG. 3, the means for preventing an animal from placing its head in the feeding trough comprises a loudspeaker 55 for issuing an animal-deterring sound. Alternatively or additionally, the means for preventing an animal from placing its head in the feeding trough may comprise a lighting device 54 for producing an animal-deterring light. In particular when several feed troughs are juxtaposed, the use of deterring light is desirable, because it can be focused so that it only produces an effect on one particular feed trough.

In the second embodiment according to FIG. 4, the means for preventing an animal from placing its head in the feeding trough may comprise a closing means 65 which is movable across entrance opening 61. When closing means 65 is moved across entrance opening 61, the contents of the feed trough 60 become inaccessible to a particular animal. In the embodiment shown, closing means 65 is a vessel-shaped element capable of rotating about an axle 66. Said axle 66 may be a motor-driven axle, said motor being controlled with the aid of data from animal identification component 62.

Additionally there may be provided an electric voltage supplying source 67 for supplying an animal-deterring electric voltage to closing means 65. Animals approaching feed trough 60 undesirably often make contract with feed trough 60. They will in particular touch closing means 65 with their noses. By connecting precisely those components of the feed trough that are regularly touched by animals with voltage supplying source 67, it is possible to deter a particular animal very locally. Accordingly, such voltage supplying source 67 can also be used independently of a closing means.

The second embodiment also comprises a control device 63 and a tube-shaped chute 64 for the feed.

The devices described can be designed extremely compactly when the means for preventing an animal from using a feed trough are integrated in the animal identification component. Alternatively the means for deterring an animal's use of the feeding apparatus may be separate means.

In the third embodiment according to FIG. 5, the closing means is constituted by feed trough 75 itself which is rotatably disposed about an axle 81 which may be motor-driven, said motor being controlled by the animal identification system.

In order to prevent the loss of feed, in the position in which feed trough 75 closes entrance opening 76, feed trough 75 is provided with a wall portion 80 for preventing spillage of feed from feed trough 75. Said wall portion 80 can also act as a feed-guiding means for feed supplied through tube-shaped chute 79 to feed trough 75.

As described, in the second and third embodiment a simple but reliable construction is provided due to the fact that the closing means rotates about an axle and being driven by a motor controlled by the animal identification device. For the purpose of providing, not only a simple but reliable construction, but also a compact construction, rolls 69 (FIG. 4) and 83 (FIG. 5) are preferably driven by motors 68 and 82 respectively, said rolls 69 and 83 being in contact with corresponding closing means 65 and 75. In the third embodiment the feed trough 75 thus bears on the animal identification component 77 via roll 83.

Although for roll 83 a separate torque roll may be used, it is preferred when roll 83 performs both the function of driving the closing means, in this case feed trough 75, and the function of a torque measuring roll. Of course, in the alternative case in which feed trough 75 is moved by the axle 81 driven by a motor, torque can also be measured via that motor.

Figure 6:
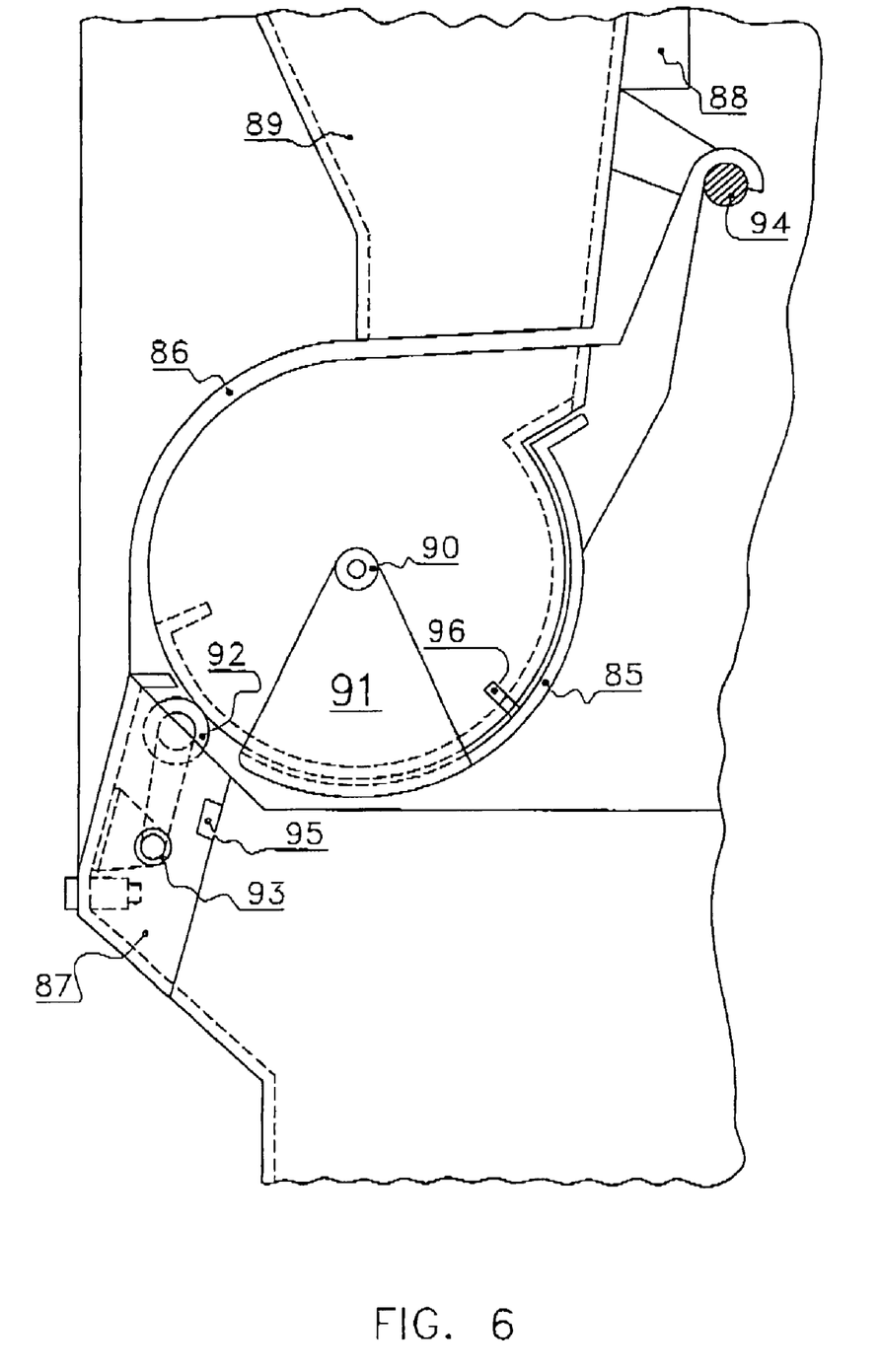
FIG. 6 shows a fourth embodiment of means for measuring the amount of a type of feed consumed by an animal in an apparatus according to the invention.

The fourth embodiment, as shown in FIG. 6, comprises both means for deterring an animal wishing to make use of feed trough 85 with the aid of data from the animal identification component 87, and means for weighing the feed present in feed trough 85.

The deterring means are constituted by a separate closing means 91 which is rotatable about an axis 90. Closing means 91 is rotated by a roll 92, capable of coming into contact with closing means 91, and is driven by a motor 93 which is controlled by animal identification component 87.

In this embodiment the weighing means are constituted by a feed trough 85 which is rotatable about an axle 94. Feed unit 85 can be brought into contact with roll 92, and is subject to a reciprocating movement by correct operation of motor 93 by which roll 92 is driven. By the movement of feed trough 85 a torque is generated which can be measured by the torque measuring mechanism 95.

In FIG. 6, roll 92 makes contact with feed trough 85 and the latter can be set in motion for determining the amount of a type of feed present in feed trough 85. After an animal has consumed the type of feed, the amount of remaining type of feed can be determined by torque movement. Then roll 92 is controlled by motor 93 in such a way that it partially covers the entrance opening 86. A catching device 96 on feed trough 85 moves closing means 91 until the latter comes into contact with roll 92. Then roll 92 controls closing means 91 so that it covers the entire entrance opening 86. As a result of the fact that feed trough 85 is no longer in contact with roll 92, feed trough 85 is returned by gravity to the starting position in which a next type of feed can possibly be supplied by a control device 88 via the tube-shaped chute or channel-shaped chute 89.

Figure 7:
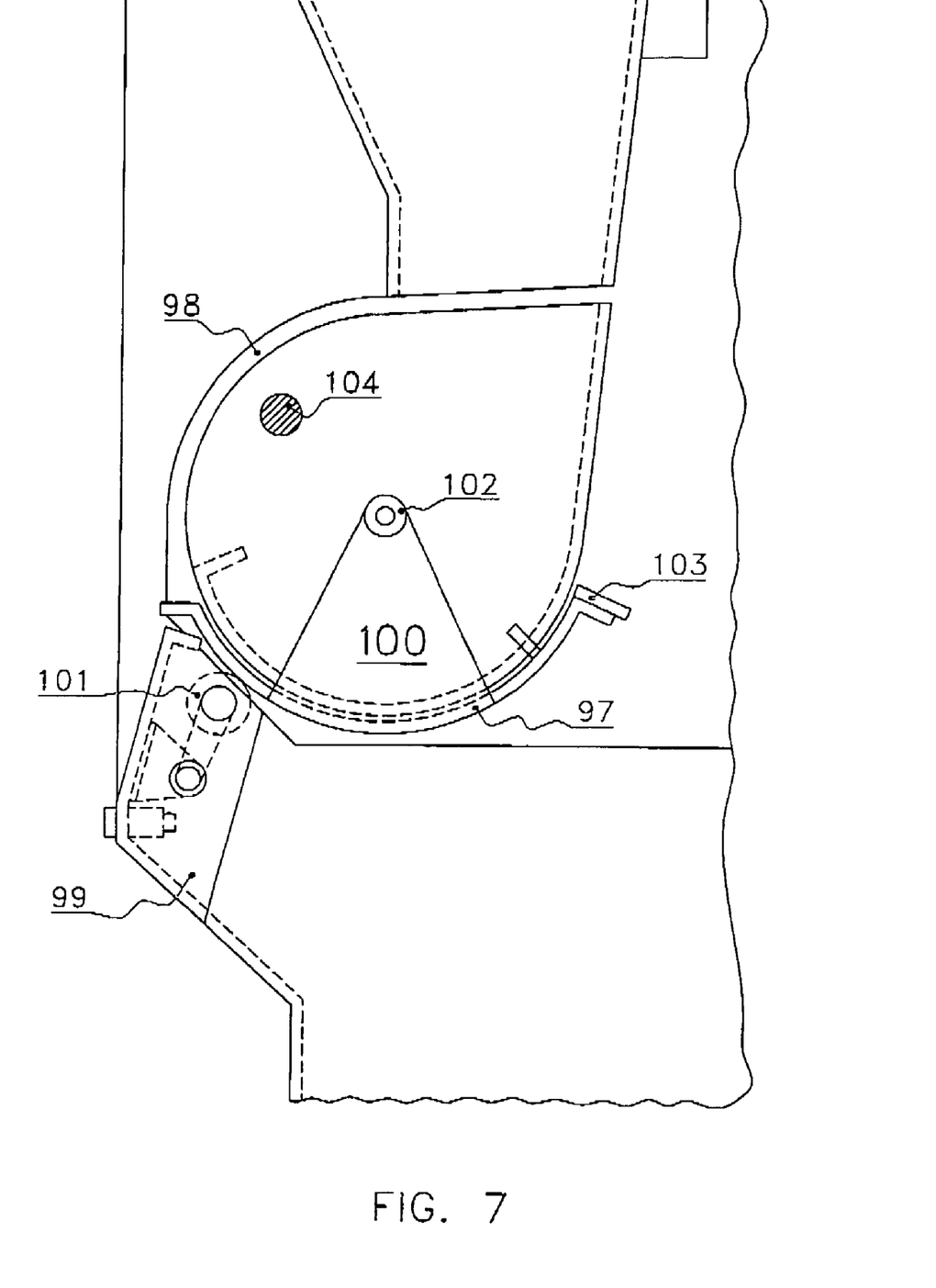
FIG. 7 shows a fifth embodiment of means for measuring the amount of a type of feed consumed by an animal in an apparatus according to the invention.

The fifth embodiment according to FIG. 7 differs from that of FIG. 6 by the location of the pivot axle 104 about which feed trough 97 rotates. Pivot axle 104 is disposed close to roll 101 for driving feed trough 97 and measuring the torque, for measuring very small differences in amount of feed. There is also provided a stop 103 for preventing superfluous movement of feed trough 97. A closing means 100 for closing entrance opening 98 pivots about an axle 102.

The invention will be explained hereinafter with reference to a feed ration to be offered to a cow, which ration may be composed of the following four types of feed: concentrate, ensilaged grass, corn and brewer's grains. However, it will be appreciated that other types of feed can be added or certain types of feed can be replaced by other types of feed or both variations may be involved. The adding of a certain amount of liquid has been described above and will not be set out again.

Until now the four types of feed have been supplied to the feed trough collectively or as a mixture, irrespective of the prevailing circumstances. According to the invention there is provided variation in the offered feed in that the corresponding control device 19, 42, 52, 63, 78 or 88 controls the apparatus so that amount of a sort of feed to be supplied to the relevant feed trough 6, 31, 49, 60, 75, 85 or 97 is based on the measured values of relevant variable parameters. For example, based on a measured value, more concentrate and ensilaged grass, but less corn and brewer's grains may be supplied. On the other hand, in the case of changing circumstances, more ensilaged grass and less corn, concentrate and brewer's grains may be provided. It will be understood that the amount per type of feed is controlled by the control device.

The ratio and amounts are also determined based on individual animal preferences, environmental conditions in view of the desired economic results.

It has been found for example that one cow may prefer brewer's grains to other types of feed, whereas another cow may prefer concentrate and finds brewer's grains not tasty at all. The invention may be used advantageously to prevent that the latter cow, just because brewer's grains is present in the offered feed, consumes less than desirable. For example, in such a situation, when brewer's grains do not contain a nutritive ingredient that the other types of feed do contain, brewer's grains are not offered to that cow. But when that cow needs an ingredient that is only present in brewer's grains, the control device is capable of controlling the relevant components so that the composition of the mixture is such that the cow will consumes the brewer's grains. Such a control by the control device can take place due to the fact that such data are stored in the memory of the computer.

It has further been found that in humid circumstances cows prefer drier feed mixtures, whereby more dry ensilaged grass, and less of wetter concentrates are provided.

The atmospheric-condition-measuring means described above then ensures an automatic adaptation of the ratio or amount or both provided to the cows that takes into consideration the measured temperature, humidity, atmospheric pressure, wind speed and the like.

Much the same as with human beings, the optimal feed intake of a cow may depend on the point of time of the day, and thus it is possible to distinguish for example breakfast, lunch and dinner. Also these data may be included in the memory. When a clock, which is not explicitly shown in the drawings, but is implicitly present in the computer, indicates the point of time of the day and issues a corresponding time signal to the control device, the point of time of the day is automatically be taken into account. It has further been found that there is for each cow a season-dependence in the ratio and amount of types of feed offered to ensure an optimal intake, which can automatically be taken into account by means of the clock.

As mentioned in the foregoing, the consumption rate (from which the preferences, and tastes of an animal can be deduced), the milk yield, and the amount of energy or protein or fat or minerals or amino acids or any combination thereof, and the like present in the milk produced by a cow appear to be suitable for being used as data in the memory for controlling the ratio and amount of the types of feed to be supplied. Measuring devices for measuring the value of the mentioned parameters are well known in the art.

Such data, analogous to what has been described above in relation to adding liquid, can be inputted into the computer by means of the keyboard or another comparable inputting member for inputting data into the memory. Such data can also automatically be generated by the control device itself, by providing variation in the types of feed to be offered and by determining the feed intake resulting therefrom, or the economic result resulting therefrom, and by automatically varying the offered feed in dependence on the result. This feedback can also take a developing animal into account.

Because a considerable amount of data can be used by the control device for generating the control signal, there can also be provided a priority algorithm, as a result of which, on determining the order of types of feed to be offered, one data (for example milk yield) is given priority over another data (such as consumption rate) when generating the control signal. Moreover, weight factors can be allotted to the various data, so that it is possible to take several data into account simultaneously. Such programs and algorithms are known to persons skilled in the art.

Because possible combinations of data per cow is great, for the sake of simplicity of the description it is impossible to describe all possible combinations. With the aid of the above-mentioned information, however, it is possible for a person skilled in the art to obtain, depending on such person's wishes, the desired amounts and ratios of types of feed to be offered by means of simple trial and error tests.

Although we have disclosed the preferred embodiments of our invention, it is to be understood that it is capable of other adaptations and modifications within the scope of the following claims:

The invention claimed is:

1. An apparatus for automatically supplying feed to an animal comprising:

manger means;

control means for generating a control signal to selectively control a supply amount and sequence of at least two different types of feed provided to said manger means; and parameter measuring means for measuring the value of a variable parameter and for issuing a parameter value signal to said control means;

wherein said control means comprises processing means for processing the parameter value signal into the control signal, said processing means generating the control signal using an algorithm for prioritizing measured parameters and input data;

wherein said parameter measuring means comprises means for determining the substantially concurrent milk yield of an animal consuming feed from said manger means and issuing a signal relating to the milk yield to said processing means.

2. An apparatus for automatically supplying feed to dairy animals comprising:

a feed trough;

a feed control device having computer means including a memory; and parameter measuring means for measuring the substantially concurrent milk yield produced by an animal at said feed trough, and for issuing data relating to the milk yield to the memory;

wherein said control device generates control signals for selectively controlling a supply amount and sequence of at least two types of feed provided to said feed trough using an algorithm for prioritizing measured parameters and input data.

* * * * *